3,317,288
NIOBIUM-SILICON BRAZING ALLOY FOR REFRACTORY METALS
James C. Marshall and Ronald H. Mueller, Cincinnati, Ohio, assignors to the United States of America as represented by the United States Atomic Energy Commission
No Drawing. Filed Mar. 13, 1964, Ser. No. 351,873
2 Claims. (Cl. 29—198)

Our invention relates to brazing alloys for refractory metals and more particularly to brazing alloys for joining tantalum, niobium and their alloys.

Tantalum and niobium as well as other refractory metals are useful for numerous high temperature applications in the nuclear energy and space fields. For example, nuclear reactor components are being developed for service at temperatures from 2000° C. to 2400° C., and evaluation of such components requires stability in fabricated joints under the same parameters as the base metals. Many of these components require sealing or closure brazing and/or structural joints for attaching to support hardware.

Tantalum and niobium have been successfully joined by welding, brazing and diffusion bonding, but numerous joint configurations and tolerances are encountered such that brazing is the only practical method. Satisfactory brazing alloys have been developed for lower temperatures, but at temperatures of 200° C. to 2400° C. existing brazing alloys exhibit serious defects such as erosion of the base metal and joint embrittlement.

It is desired to provide a brazing alloy system which allows selection of a brazing temperature within the range stated above and which provides a rapid increase in remelt temperature of the joint so that the joint is suitable for service in the same temperature range.

It is therefore an object of our invention to provide a method of joining tantalum, niobium and their alloys at a temperature of 2000° C. to 2400° C.

Another object is to provide a brazing alloy system for said metals characterized by a rapid increase in the remelt temperature of the joint.

Other objects and advantages of our invention will be apparent from the following detailed description and claims appended hereto.

In accordance with our invention tantalum, niobium and alloys containing a predominant proportion thereof are joined to themselves and to one another by brazing at a temperature of 2000° C. to 2400° C. with a brazing alloy of the composition 0.5 to 7.0 weight percent silicon and the balance niobium. This alloy system allows selection of a brazing temperature within the stated range, and the remelt temperature is rapidly increased for service at these temperatures. Moderate-sized, even fillets are formed with these alloys, and erosion of the base metal is minimized.

The proportion of silicon in the brazing alloys system of our invention may be varied from 0.5 to 7.0 weight percent. Below 0.5 percent the alloy is unsuitable because there is insufficient melting point change from that of pure niobium and above 7.0 percent because a silicon-niobium eutectic limits both additional melting changes and the fillet microstructure. The melting point and brazing temperature, which is normally about 25° C. above the melting point, are increased with decreasing amounts of silicon. Brazing temperatures for varying silicon contents are as follows: 7 weight percent, 2000° C.; 4 weight percent, 2250° C.; 2 weight percent, 2350° C.; 1 weight percent, 2375° C. and .5 weight percent, 2400° C.

This brazing alloy system is useful for brazing tantalum and niobium and alloys containing a predominant proportion thereof to themselves and one another, the base-metal alloys being limited to body centered cubic alloys containing at least 50 weight percent of tantalum, niobium or a combination of these metals and having a melting point higher than the brazing alloy. Examples of tantalum and niobium alloys included within this designation are tantalum-10 weight percent tungsten, tantalum-30 weight percent niobium-7 weight percent vanadium, and tantalum-8 weight percent tungsten-2 weight percent hafnium.

Brazing is effected by disposing the brazing alloy in the form of powder or sheet at the joint interface and heating the assembly to temperature in a non-oxidizing atmosphere, which may be an inert or reducing atmosphere. A hydrogen atmosphere is preferred above 1650° C. A period of about 5 minutes at the brazing temperature is normally sufficient to obtain adequate flow, but larger or thicker parts may require a longer heating period. The high brazing temperatures required for these alloys may be achieved by the use of a conventional resistance-type furnace.

The metallurgical character of the brazed joint obtained with these alloys varies with the silicon content. At 7 weight percent silicon, a eutectic structure is obtained, at 1 to 7 weight percent a two-phase structure, and at .5 weight percent a solid solution. Despite the difference in structure, all of these joints are strong and exhibit essentially the properties of the base metal in service.

Our invention is further illustrated by the following example.

Example

A series of brazing tests was conducted with niobium-silicon brazing alloys of varying composition. In each test a sheet of brazing alloy was placed adjacent the joint line of a tantalum T section. The T section assembly was then heated in a resistance furnace to 1650° C. in helium. The helium was purged out with hydrogen at this temperature and the T section was heated to a predetermined temperature, held for five minutes, and cooled to 1650° C. in the hydrogen atmosphere. At this time the hydrogen was purged by helium and cooling was continued to room temperature. A heating rate of 100° F./minute was normally maintained. The T sections were examined visually for extent of melting and flow and metallographically for fillet porosity, cracking and erosions. These tests were repeated in 25–50° C. intervals until the brazing temperature was determined. In each case a sound joint was formed with only slight erosion of the base metal. Further details may be seen by reference to the following table.

TABLE.—JOINING OF TANTALUM WITH NIOBIUM-SILICON BRAZING ALLOYS

| Composition (Wt. percent) | Cast Grain Size of Brazing Alloy | Cold Forgeability (Percent Reduction) | Brazing Temperature (°C) | Fillet Size | Joint Microstructure |
|---|---|---|---|---|---|
| Nb-7 Si | Large | Brittle | 2,000 | Medium | Eutectic. |
| Nb-4 Si | Intermediate | do | 2,250 | Small | Two phase. |
| Nb-2 Si | Small | do | 2,350 | do | Do. |
| Nb-1 Si | Very small | 50% | 2,375 | do | Very slight two phase. |
| Nb-.5 Si | do | >50% | 2,400 | do | Solid solution. |

The above example is merely illustrative and is not to be understood as limiting the scope of our invention, which is limited only as indicated by the appended claims.

We claim:

1. A composite structure comprising at least two structural portions selected from the class of metals and alloys consisting of tantalum, niobium, and alloys containing predominant proportions thereof joined to one another by a fused brazing alloy having a composition, prior to brazing, consisting essentially of 0.5 to 7.0 weight percent silicon and the balance niobium, the joint provided by the fused brazing alloy being characterized by having a melting temeprature greater than the melting temperature of the brazing alloy.

2. The method of joining tantalum, niobium and alloys containing a predominant proportion thereof to themselves and to one another which comprises disposing surfaces of the parts to be joined into abutting relationship with a brazing alloy disposed adjacent said abutting surface, said brazing alloy consisting of 0.5 to 7.0 weight percent silicon and the balance niobium, heating the resulting assembly to brazing temperature in a non-oxidizing atmosphere in the range of 2000° C. to 2400° C. and cooling the resulting brazed joint.

References Cited by the Examiner

"Transactions," American Society for Metals, Preprint No. 70 (1957), vol. 51, p. 15.

Constitution of Binary Alloys, by Hansen, 1958, p. 1016.

JOHN F. CAPMBELL, *Primary Examiner.*